United States Patent [19]

Lee, III et al.

[11] Patent Number: 4,645,679
[45] Date of Patent: Feb. 24, 1987

[54] PROCESS FOR MAKING A CORN CHIP WITH POTATO CHIP TEXTURE

[75] Inventors: William E. Lee, III; James M. Bangel; Robert L. White; David J. Bruno, Jr., all of Cincinnati, Ohio

[73] Assignee: The Procter & Gamble Co., Cincinnati, Ohio

[21] Appl. No.: 685,276

[22] Filed: Dec. 24, 1984

[51] Int. Cl.$^4$ .......................... A23L 1/10; A23L 1/01
[52] U.S. Cl. .................................. 426/560; 426/626; 426/438; 426/439; 426/464; 426/808
[58] Field of Search ............... 426/560, 438, 626, 464, 426/808, 439

[56] References Cited

U.S. PATENT DOCUMENTS

| | | | |
|---|---|---|---|
| 3,278,311 | 10/1966 | Brown et al. | 426/439 |
| 3,368,902 | 2/1968 | Berg | 426/626 |
| 3,539,356 | 11/1970 | Benson et al. | 426/808 |
| 3,545,979 | 12/1970 | Ghafoori | 426/808 |
| 3,634,095 | 1/1972 | Willard | 426/808 |
| 3,666,511 | 5/1972 | Williams et al. | 426/808 |
| 4,312,892 | 1/1982 | Rubio | 426/626 |

*Primary Examiner*—Jeanette Hunter
*Attorney, Agent, or Firm*—Gary M. Sutter; Rose Ann Dabek; Richard C. Witte

[57] ABSTRACT

A process for making a corn chip with potato chip texture is described. The chip has increased mouthmelt, crispness, and lightness like potato chips and it is less hard and gritty than standard corn chips. It also has a distinctive corn flavor. In a preferred process, corn is cooked in water at 140° F. (60° C.) to 212° F. (100° C.) for 30 minutes to 4 hours. The corn hulls are removed, and the corn is comminuted. A starch material is cooked in water until it is adequately hydrated, and then comminuted. The comminuted corn and starch material are mixed together to form a dough having a ratio of corn to starch material of 95:5 to 80:20. The dough is extruded, formed into a sheet, cut into segments, and deep-fried to form the finished chip.

11 Claims, No Drawings

PROCESS FOR MAKING A CORN CHIP WITH POTATO CHIP TEXTURE

FIELD OF INVENTION

This invention relates to corn chips having potato chip texture; they exhibit a high degree of mouthmelt, crispness, and lightness with low hardness and grittiness. A process for making these corn chip products is also disclosed.

BACKGROUND OF THE INVENTION

As described by Matz, *Snack Food Technology*, conventional corn chip process begins with a corn meal or corn masa. Both white and yellow corn of the dent type are added to a vat containing heated water and a proportionate amount of lime. The mixture is heated to the boiling point, the heat is cut off, and the contents of the vat are allowed to stand undisturbed for 10 to 20 hours. During these heating and steeping steps, the corn hulls are hydrated and partially hydrolyzed. The hulls are softened to a jelly-like consistency and are easily removed later in the process. The starch is also gelatinized. By the end of the steeping period, the corn kernels have absorbed about 50% by weight water. The hulls are removed in a washer by jets of water which also remove any remaining lime. The washed kernels are then transferred to a stone mill where they are ground into dough or masa. The masa is formed (usually by hand) into large cylindrical loaves and then fed into hydraulically powered extrusion presses. The cylindrical chamber of the press contains a closely fitting piston which forces the dough through a die plate having a series of slot-like ports about ½ inch (1.27 cm.) wide. A cutting device severs the extruded strands into pieces, usually 1.5 inch (3.81 cm.). Alternatively, the dough can be rolled out into a thin sheet from which shapes can be cut. Dough pieces fall directly into cooking oil held at about 375° F. (190.6° C.). After the moisture content has been reduced to a few percent, the chips are salted, cooled, and packaged.

The conventional process of producing corn chips has the disadvantages of producing chips that are gritty and do not easily melt in the mouth. Corn chips are usually dry and brittle in texture. Corn chips also have a distinctive corn flavor. Potato chips, on the other hand, have a high degree of mouthmelt.

Several patents disclose corn chips made from a combination of corn and potatoes. See for example, U.S. Pat. No. 3,539,356 issued to Benson et al. which describes a process for making snack chips from corn and potatoes in which the starting materials include at least 30% to 70% potatoes. The process comprises mixing the corn and potatoes into a dough, working and shaping the dough into a relatively thin piece having a sheer strength of at least 75 pounds, cutting the dough into chips, and deep-fat frying the chips in oil.

U.S. Pat. No. 3,545,979 issued to Ghafoori discloses a process for producing a snack chip from raw potatoes and whole kernels of corn, wherein the preferred mixture is 60% potatoes and 40% corn. The potatoes are peeled, sectioned, and washed. The corn kernels are steeped in a mild alkaline solution for several hours. Then the sectioned raw potatoes and steeped corn kernels are ground together in a stone grinding mill to produce a dough. The dough is sheeted and cut into chips, and the chips are deep-fried in oil and salted.

U.S. Pat. No. 3,666,511 issued to Williams et al. discloses a snack chip containing 30% to 70% of a cross-linked waxy starch and 30% to 70% of a cross-linked non-waxy starch. Up to 10% of potato starch may be added to this starch mixture.

It is an object of this invention to produce a corn-/potato chip with a distinctive mild corn flavor having a texture more like that of potato chips. The corn chip is less gritty than conventional corn chips and it easily melts in the mouth.

This and other objects of this invention will become apparent by the description of the invention below.

All percentages are on a dry weight basis unless otherwise defined.

SUMMARY OF THE INVENTION

The invention is a process for making corn chips with potato chip texture comprising the steps of:
(a) comminuting hydrated corn having a moisture content of about 30% to about 40%;
(b) comminuting hydrated starch material;
(c) mixing the corn and starch materials into a dough, the ratio of corn to starch material being from about 95:5 to about 80:20, and the dough having a moisture content of about 30% to about 55%;
(d) extruding the dough;
(e) forming the dough into a sheet;
(f) cutting the sheet into segments; and
(g) deep-frying the segments.

The corn/potato chip has increased mouthmelt like potato chips and a mild corn flavor.

DETAILED DESCRIPTION OF THE INVENTION

The present invention provides a process for making a corn chip with potato chip texture. Potato chips are known to be very lubricious—they quickly melt in the mouth. Commercial corn or tortilla chips are gritty and have a low degree of mouthmelt or lubricity. The corn chip of this invention can be described as crisp with a high degree of mouthmelt/lubricity and reduced hardness/grittiness. It has a distinctive corn flavor of moderate intensity.

The process as well as the raw materials are important in achieving the desired flavor and texture of the present corn chip. The first step of the process is to prepare a comminuted hydrated corn. In the most preferred process, raw corn kernels are cooked in water and lime. The corn may be any one variety or mixtures of the varieties. Both white and yellow corn of the dent variety can be used. Preferably a mixture of from about 4:1 to about 1:4 white to yellow corn is used.

The lime softens and loosens the corn hulls for subsequent removal, and also contributes to the corn chip flavor. Enough lime is added to loosen the hulls; generally, about 0.2% to 3% lime, and preferably about 1%, is used. Water is used in an amount sufficient to cover the corn with excess water. The ratio of lime:corn:water will usually be about 1:50:100 to about 1:200:400, and preferably about 1:100:200. The lime, water and corn are added to a cooking vessel, and the corn is heated and steeped until the hulls are softened. After cooking, the moisture content of the corn should be about 30% to about 40%. Cooking times, temperatures and pressures can be varied, the cooking time decreasing with increased cooking temperature. The corn is usually cooked at a temperature of between about 140° F. (60° C.) and 212° F. (100° C.) for about 30 minutes to 4 hours, and preferably at about 180° F. (82.2° C.) to about 190° F. (87.8° C.) for about 30 to about 50 minutes. The corn may also be hydrated in a pressure cooker, i.e. at pressures above atmospheric. The main purpose of the cooking is to hydrate the corn, but microbiological and economical factors are also involved.

After cooking, the corn is washed and the hulls are removed. The lime-softened hulls can be removed by mechanical agitation and rinsing.

Next the corn is comminuted. Any method of comminution can be used, such as grinding. It is particularly advantageous in terms of texture to comminute the corn by cutting it with a cutting mill such as an Urschel Comitrol, manufactured by Urschel Laboratories, Inc., of Valparaiso, Ind. U.S. Pat. No. 3,278,311, issued to Brown et al., describes the comminution of corn by an Urschel cutting mill. Cutting instead of grinding contributes to the improved crispness and mouthmelt of the present corn chip. A Comitrol head of about 0.09 inch (0.23 cm.) size can be used to cut the corn into particles about 0.06 inch (0.15 cm.) to 0.09 inch (0.23 cm.) in diameter. Another method of comminuting the corn is by micropulverizing the corn into particles that go through a ¼ inch (0.64 cm.) screen. As an alternative to comminuting corn kernels, corn masa can be obtained and hydrated to a moisture content of about 30% to about 40%. As described below for comminuted corn, the hydrated corn masa will later be mixed with a starch material.

A modification of the described process is particularly preferred. Hydrated cut corn having a moisture content between about 30% and about 40% is further hydrated by steeping it in water at a temperature of about 150° F. (65.6°) to about 170° F. (76.7° C.) for about 24 to about 48 hours, preferably at about 160° F. (71.1° C.) to about 170° F. (76.7° C.) for about 24 to about 36 hours. The further hydrated corn will have a moisture content of about 60% to about 70%. The post-comminution hydration is meant only to further hydrate the corn rather than to further cook it. A temperature of 160° F. (71.1° C.) to 170° F. (76.7° C.) eliminates microbiological growth. Immersing the ground corn in water at a higher temperature would constitute further cooking and gelatinization of the corn starch. The instant process gives a lower level of gelatinization. It is believed that this method minimizes starch damage, while a higher temperature process could result in a higher level of starch damage (rupture of the starch molecules).

Separate from the preparation of the hydrated corn masa, a starch material is hydrated to a moisture content of about 30% to about 50%. If it is not hydrated enough, the resulting chip product will be too gritty. Any starch material may be used in this process, such as potatoes, potato starch, tapioca starch, unflavored starch, or corn starch. A preferred source of starch material is dehydrated potatoes. Potatoes are used for their flavor contribution as well as their texture contribution. Tapioca starch, unflavored starch, and corn starch are less preferred. Percentages herein are on a dry weight basis so that whole potatoes can be directly compared to dehydrated potatoes and tapioca starch.

As described below, the moisture content of the corn and potato dough after mixing should be about 30% to about 55%. The moisture content of the starch material can be chosen and adjusted so that after it is mixed with the corn the resulting dough will have the desired 30% to 55% moisture content. Therefore, no particular cooking time and temperature is required. The starch material may be hydrated to a moisture content of up to about 80%, preferably between about 60% and about 75%. The cooking time may be between about 30 minutes to 4 hours at temperatures between about 115° F. (46.1° C.) and 212° F. (100° C.), and preferably between about 5 and 10 minutes at about 115° F. (46.1° C.) to about 125° F. (51.7° C.). Excess water should be available in the cooking vessel to hydrate the starch material. It has been found that a ratio of 12 water:1 starch material works well with dehydrated potatoes. After being cooked, the starch material is comminuted by a method such as grinding or micropulverizing. Any conventional grinding process can be used.

The comminuted corn and the comminuted starch material are then mixed together in a low work input mixing machine to form a dough. Any conventional mixer such as a Hobart or Readco mixer can be used. The ratio of corn to starch material should be between about 95:5 and about 80:20, and preferably between about 94:6 and about 83:17. For proper hydration and for acceptable sheeting, the dough after mixing should have a moisture content of between about 30% and about 55%. Water is added to or removed from the mixing vessel if needed. The mixing is continued until the corn and starch material and moisture are well mixed into a homogeneous dough. About 2 to 3 minutes of moderate mixing is generally adequate for a suitable dough. This step can be termed "premixing", as opposed to the further mixing with high work input in the next step of the process.

The dough is next subjected to additional work input to enhance hydration and gelatinization of the starch particles, to reduce grittiness in the finished corn chip, and to improve cohesiveness of the dough. This additional work input is done by extruding the dough. Preferably, the dough is extruded at about 180° F. (82.2° C.) to about 190° F. (87.8° C.) (outlet temperature) for about 5 to 15 minutes (residence time). Any conventional cooking extruder can be used, preferably, a twin screw extruder is used. Alternatively a heated Readco mixer can also be used. The 180° F. (82.2° C.) to 190° F. (87.8° C.) outlet temperature is a function of both the extruder jacket temperature and the amount of work input to the dough. Extrusion mixing imparts both mechanical work and compression-type work to the dough. If the starch portion of the dough was not sufficiently gelatinized in the cooking step, the increased work input during the extrusion can compensate for the lack of gelatinization.

The level of base soluble starch of a corn dough gives a general indication of how much energy input there has been into the dough. Factors which can affect energy input include dough sheet formation and frying conditions. By far the most important factor is the amount of energy input during the dough-making step. The greater the amount of energy input during dough formation, the higher will typically be the level of base soluble starch. This higher level of base soluble starch usually provides a more cohesive dough which sets up to provide a more cellular, bubbly structure in the chip during subsequent frying.

The dough is next formed into a sheet, usually by milling or extruding. While the dough may be milled in any workable manner, good results have been obtained by milling the dough with two-roll mills. These sheeting rolls comprise a front roll and and a back roll which rotate about generally parallel longitudinal axes. The back roll has a diameter slightly larger than that of the front roll. The back roll thus rotates at a speed slightly faster (usually about 1% to about 3% faster) than the front roll. Further, the back roll is usually kept at a higher temperature (normally 10° F. to 40° F. greater in temperature) than the front roll. This combination of faster rotational speed and higher temperature insures that the forming dough sheet adheres to the surface of the back roll rather than the front roll. As the dough sheet rotates along the surface of the back roll, the sheet is scraped off by suitable means usually in the form of a doctor blade.

The dough can be passed through a tightly gapped two-roll mill to crush the corn and potato particles. By "tightly gapped" is meant that the gap between the rolls is set at 0.002" (0.005 cm.) to 0.004" (0.01 cm.). The milled dough will have a thickness of about 0.012" (0.03 cm.) to 0.018" (0.046 cm.). This crushing improves the texture while maintaining flavor. If the dough has previously been optimally hydrated through sufficient work input or cooking, this milling step is not necessary.

The dough is passed through a two-roll mill for sheeting. The mill gap should be set at about 0.014" (0.036 cm.) to 0.016" (0.041 cm.). The sheeted dough will then have a thickness of about 0.024" (0.06 cm.) to 0.030" (0.076 cm.). While the dough does not need to be sheeted to any particular thickness, if the sheet is too thick some of the mouthmelt advantage will be lost.

After the dough is milled into a sheet, dough pieces or segments are formed from the sheet. Typically, the dough segments are formed by cutting the sheet into pieces of the desired shape and size. For example, segments can be formed having the rectangular shape of most commercial corn chips, or the triangular or round shape of tortilla chips. Rectangular corn chips varying in size between about ½" (1.27 cm.)×2½" (6.35 cm.) and 1" (2.54 cm.)×3" (7.62 cm.) are preferred. The instant invention is not limited to corn chips per se, but can also include tortilla chips provided they fall within parameters of the invention outlined herein.

The segments are then deep-fried in oil. Any kind of frying oil may be used, such as vegetable oil or animal fat. The oil or fat can be hydrogenated. Suitable oils include corn oil, soybean oil, palm oil, sunflower seed oil, and mixtures of these oils. Suitable animal fats include lard and tallow. Marine fats and oils such as menhaden, can be used. This list is exemplary and is not intended to be all inclusive.

Judgement is exercised in the choice of fry time and temperature to obtain a corn chip with the desired eating quality and the correct color. It is a common practice in the art to fry chips until they reach a "doneness" endpoint. A balance is struck between raw flavor notes and cooked flavor notes. The color of the chip can range from yellow to golden to brown. A rule of thumb in the development of this process was that the frying was complete when the bubbling of the oil stopped. Bubbling of the oil is related to moisture released from the chip. A lower frying temperature requires a longer frying time, and vice versa. However, if the temperature is too low (300° F. to 350° F.) the resulting chips will be too oily. Preferably the corn chips of the present process are deep-fried in vegetable oil at about 380° F. (193.3° C.) to 390° F. (198.9° C.) for about 23 to 27 seconds. The finished chips are crisp, non-gritty, and lubricious. The fat content of the chips can be between about 30% and about 45%, preferably the fat content is between about 32% and about 39%.

Salt or other flavor enhancers or seasonings may be applied to the finished corn chip. Preferably the chip has about 1.2% to 1.8% added salt, and most preferably about 1.5% salt. An electrostatic salting machine may be used to apply the salt or seasonings. Other flavor enhancers and seasonings that can be used are salt substitutes. e.g. potassium chloride, ammonium chloride, seasoning salt and herbal salts. Cheeses and synthetic cheese flavors can also be used.

Corn chips generally have a low degree of mouthmelt or lubricity; they only absorb small amounts of saliva in the mouth during mastication, and hence they do not easily melt in the mouth. Potato chips, on the other hand, have a high degree of mouthmelt. The low degree of mouthmelt in corn chips has been found to be a textural negative to consumers. Therefore, it is desirable to produce a corn chip having a high degree of mouthmelt similar to that of potato chips. The process of the instant invention produces corn chips with high mouthmelt. Lubricity or mouthmelt can be measured by water absorption data in which the weight of water absorbed by a chip per weight of chip is measured over a finite length of time; the theory is that increased mouthmelt relates to more rapid pick-up of water (saliva) in the mouth during mastication.

The moisture absorption test procedure is as follows: The dry weight of a chip is measured and the chip is immersed in water for 10 seconds at room temperature. The chip is then removed from the water, placed on a paper towel for about 30 seconds, and weighed. The dry weight is subtracted from the weight after immersion. This number is divided by the dry weight to provide a figure for the weight of water absorbed per dry weight of chip during 10 seconds. This value is termed the "water absorption". The 10 second time was selected because it seemed to be a reasonable in-the-mouth mastication time. Various types of chip were tested. A popular commercial corn chip had a water absorption of about 0.22. A commercial tortilla chip had an absorption of about 0.18. By contrast, a popular brand of potato chip has a water absorption of about 0.48, much higher than the corn chip and the tortilla chip. This demonstrates that the water absorption score correlates with the level of mouthmelt. The present corn/potato chip had a water absorption of about 0.30, which indicates a higher degree of mouthmelt than the corn chip or tortilla chip. The corn/potato chip of this invention will have a water absorption of at least about 0.25, preferably at least about 0.30, and most preferably at least about 0.35.

EXAMPLE I

Ten kilograms of water and 50 grams lime were combined in a stock pot. The stock pot was heated in a steam bath until the water temperature reached 185° F. (85° C.). Five thousand grams of corn were added to the pot and the pot was stirred slowly to facilitate heating, until the water temperature again reached 185° F. (85° C.). The corn was cooked for 40 minutes with occasional stirring and then the pot was removed from the steam bath. Cold tap water was added to the pot, and the contents were stirred, to cool the temperature down to about 115° F. (46.1° C.). Most of the water was dumped out of the pot, and the corn was rubbed by hand to soften and remove the hulls. Next the corn was dumped into a wire basket, and a hose was used to rinse the corn. The corn was then dumped back into the stock pot and rinsed with cold water from the hose. The excess water was decanted off along with the loose hulls. This rinsing and decanting process was repeated three times, after which virtually all the hulls were removed. The corn was drained on paper towels. At this point the moisture content of the corn was estimated to be about 35%. Lastly, the corn was micropulverized by using a commercial pulverizing machine. The micropulverized corn could pass through a ¼" (0.635 cm.) round screen.

A container was filled with 5,400 grams of hot tap water at a temperature of 120° F. (48.9° C.) and 450 grams dehydrated potato slices. The ratio of water to potatoes was 12:1. The total weight of the container, and potatoes was 19.3 lbs. The water and potatoes were stirred for 90 seconds and then drained through a 0.0331" (0.084 cm.) sieve. The potatoes were returned to the container and the container was refilled with hot water (120° F., 48.9° C.) until the total weight again reached 19.3 lbs. Once again, the contents were stirred for 90 seconds and drained through a 0.0331" (0.084 cm.) sieve, and the container was refilled with water to 19.3 lbs. The potatoes were soaked for 7 minutes, with occasional stirring. Then the contents were drained through a 0.0331" (0.084 cm.) sieve until all the excess water was removed. The moisture content of the potatoes was determined to be about 68% by weighing the hydrated potatoes and comparing this weight to the original dehydrated weight. Finally, the potatoes were ground in a grinding mill.

Next, 2,000 grams of the comminuted corn, 831.2 grams of the comminuted potatoes, and 180.4 grams of water were added to a standard mixer. The ratio of corn to potatoes on a dry eight basis was calculated to be 83:17. These ingredients were mixed for 1 minute at low speed and 1 minute at medium speed to form a dough. After the dough was mixed, it was passed once through a twin screw extruder for further work input. The exit temperature of the dough was about 172° F. (77.8° C.) to 180° F. (82.2° C.). The residence time for the dough in the extruder was about 5 to 15 minutes.

The dough was next milled. It was passed through a two-roll mill having roll temperatures of 80° F. (26.7° C.) and 90° F. (32.2° C.) and having a gap of less than 0.004" (0.01 cm.) for crushing. This gap size produced a dough thickness of 0.012" (0.03 cm.) to 0.018" (0.046 cm.). Then the dough was passed through another two-roll mill with a gap of 0.014" (0.036 cm.) for sheeting; the dough thickness was 0.024" (0.06 cm.) to 0.032" (0.08 cm.).

The sheeted dough was cut into 1" (2.54 cm.)×2" (5.08 cm.) to 3" (7.62 cm.) segments for frying. The segments were deep-fried in vegetable oil at a temperature of 390° F. (198.9° C.) to 405° F. (207.2° C.) for about 23 to 28 seconds, when the bubbling mostly stopped. After frying, the segments were passed through a salter where 1.5% salt was applied. The segments were then packaged.

EXAMPLE II

Corn ships were prepared as in Example I, except that tapioca starch was also used as a source of the starch material. The ingredients were 2,000 grams corn, 415.6 grams dehydrated potatoes, 140 grams tapioca starch, and 456.1 grams water. The dry weight basis ratio of corn to starch material was 88:12.

EXAMPLE III

Corn, lime, and water are added to a stock pot as in Example I. The corn was cooked at 185° F. (85° C.) for two hours. The hulls are removed as in Example I. Comminution of the corn is done by cutting instead of pulverizing. The corn is placed into an Urschel Comitrol cutting mill where it is cut into particles about 0.06" (0.15 cm.) to 0.09" (0.23 cm.) in diameter. After comminution, the corn is placed into a container with water and steeped at a temperature of 160° F. (71° C.) for 36 hours. After steeping and draining, the corn is mixed with starch material into a dough. The remaining steps of Example I are followed to produce the instant corn chip.

EXAMPLE IV

The process of Example I is followed to produce a crisp, nongritty corn chip with good mouthmelt. The chip comprises about 65% corn and starch material and 35% fat. The ratio of corn to starch material is 83:17. This chip has a water absorption of 0.31 grams water absorbed per gram dry chip after 10 seconds.

In taste tests, comparison with commercial corn chips or tortilla chips has indicated that the corn chips of Example I have other textural benefits besides increased mouthmelt. They were found to be crispier than a corn chip or a potato chip, but not as crispy as a tortilla chip. They were significantly less hard or gritty than a corn chip or a tortilla chip, although somewhat harder than a potato chip. Similarly, their flavor and texture was described as lighter than the corn or tortilla chip.

What is claimed is:

1. A process for making corn chips comprising the steps of:
    (a) comminuting hydrated corn having a moisture content of about 30% to about 40%;
    (b) separately comminuting hydrated starch material, said starch material selected from the group consisting of dehydrated potatoes, tapioca starch, corn starch and mixtures thereof;
    (c) mixing the corn and starch materials into a dough, the ratio of corn to starch material on a dry weight basis being from about 95:5 to about 80:20, said dough having a moisture content of about 30% to about 55%;
    (d) extruding the dough with a cooking extruder to provide a dough residence time in said cooking extruder of from about 5 to about 15 minutes and a dough outlet temperature of from about 180° F. to about 190° F., the starch in said hydrated corn having a high degree of gelatinization and base solubility after extrusion;
    (e) forming the dough into a sheet;
    (f) cutting the sheet into segments; and
    (g) deep-frying the segments.

2. A process according to claim 1 wherein the corn is hydrated by cooking at about 140° F. (60° C.) to about 212° F. (100° C.) for about 30 minutes to about 4 hours.

3. A process according to claim 1 wherein the corn is hydrated by cooking at about 180° F. (82.2° C.) to about 190° F. (87.8° C.) for about 30 to about 50 minutes.

4. A process according to claim 3 additionally comprising the step of further hydrating the comminuted corn at a temperature of about 150° F. (65.6° C.) to about 170° F. (76.7° C.) for about 24 to about 48 hours.

5. A process according to claim 4 wherein the comminuted corn is further hydrated at a temperature of about 160° F. (71.1° C.) to about 170° F. (76.7° C.) for about 24 to about 36 hours.

6. A process according to claim 5 wherein the corn is comminuted by cutting it with a cutting mill.

7. A process according to claim 1 wherein the starch material is derived from dehydrated potatoes.

8. A process according to claim 7 wherein the starch material is hydrated to a moisture content of about 60% to about 75%.

9. A process according to claim 7 wherein the starch material is hydrated by heating at about 115° F. (46.1° C.) to about 125° F. (51.7° C.) for about 5 to about 10 minutes.

10. A process according to claim 1 wherein the dough is formed into a sheet by milling to a thickness of about 0.024" (0.06 cm.) to about 0.030" (0.076 cm.).

11. A process for making corn chips comprising the steps of:
   (a) hydrating corn masa to a moisture content of about 30% to about 40%;
   (b) separately comminuting hydrated starch material, said starch material selected from the group consisting of dehydrated potatoes, tapioca starch, corn starch and mixtures thereof;
   (c) mixing the corn masa and starch material into a dough, the ratio of corn to starch material on a dry weight basis being from about 95:5 to about 80:20, said dough having a moisture content of about 30% to about 55%;
   (d) extruding the dough with a cooking extruder to provide a dough residence time in said cooking extruder of from about 5 to about 15 minutes and a dough outlet temperature of from about 180° F. to about 190° F., the starch in said hydrated corn having a high degree of gelatinization and base solubility after extrusion;
   (e) forming the dough into a sheet;
   (f) cutting the sheet into segments; and
   (g) deep-frying the segments.

* * * * *